(12) United States Patent
Shimada (10) Patent No.: US 11,152,665 B2
(45) Date of Patent: Oct. 19, 2021

(54) VEHICLE AND BATTERY PACK

(71) Applicant: TOYOTA JIDOSHA KABUSHIKI KAISHA, Toyota (JP)

(72) Inventor: Masaki Shimada, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 238 days.

(21) Appl. No.: 16/215,875

(22) Filed: Dec. 11, 2018

(65) Prior Publication Data

US 2019/0181398 A1    Jun. 13, 2019

(30) Foreign Application Priority Data

Dec. 13, 2017  (JP) .............................. JP2017-238550

(51) Int. Cl.
| | | |
|---|---|---|
| *B60K 1/04* | (2019.01) | |
| *H01M 50/256* | (2021.01) | |
| *B60L 50/50* | (2019.01) | |
| *B60L 50/64* | (2019.01) | |
| *H01M 50/20* | (2021.01) | |

(52) U.S. Cl.
CPC ............ *H01M 50/256* (2021.01); *B60K 1/04* (2013.01); *B60L 50/50* (2019.02); *B60L 50/64* (2019.02); *H01M 50/20* (2021.01); *H01M 2220/20* (2013.01)

(58) Field of Classification Search
CPC .. B62D 25/20; B60K 6/28; B60K 1/04; B60L 50/64; B60L 50/50; H01M 50/20
See application file for complete search history.

(56) References Cited

U.S. PATENT DOCUMENTS

| | | | |
|---|---|---|---|
| 8,833,499 B2 * | 9/2014 | Rawlinson | F41H 7/042 180/68.5 |
| 9,045,030 B2 * | 6/2015 | Rawlinson | B60L 50/66 |
| 2014/0165354 A1 * | 6/2014 | Ojima | B60L 53/80 29/281.1 |
| 2017/0149035 A1 * | 5/2017 | Sham | H01M 50/24 |
| 2017/0267057 A1 | 9/2017 | Koyama et al. | |
| 2018/0134324 A1 * | 5/2018 | Son | B60K 1/04 |
| 2018/0138471 A1 | 5/2018 | Shimada | |

FOREIGN PATENT DOCUMENTS

| | | |
|---|---|---|
| CN | 107199866 A | 9/2017 |
| CN | 206558569 U | 10/2017 |
| JP | S56-176463 U | 12/1981 |
| JP | H07-211304 A | 8/1995 |
| JP | 2011-131826 A | 7/2011 |
| JP | 2012-232641 A | 11/2012 |
| JP | 2013-244768 A | 12/2013 |
| JP | 2017-165302 A | 9/2017 |
| JP | 2018-081797 A | 5/2018 |

* cited by examiner

*Primary Examiner* — John D Walters
*Assistant Examiner* — James J Triggs
(74) *Attorney, Agent, or Firm* — Sughrue Mion, PLLC (57) ABSTRACT

A vehicle includes a battery pack, seats, and seat rails. The battery pack has a battery case and a battery unit accommodated in the battery case. The seat rails are frame members disposed over the battery pack and fixed to the vehicular body. The battery case has an upper portion with four openings located under the seat rails and formed through both an upper surface of the battery case and a side surface of the battery case.

7 Claims, 7 Drawing Sheets

VEHICLE AND BATTERY PACK

This nonprovisional application is based on Japanese Patent Application No. 2017-238550 filed on Dec. 13, 2017 with the Japan Patent Office, the entire contents of which are hereby incorporated by reference.

BACKGROUND

Field

The present disclosure relates to a vehicle and a battery pack, and in particular to a structure to mount a battery pack in a vehicle.

Description of the Background Art

Japanese Patent Laying-Open No. 2012-232641 discloses a vehicle in which in order to protect a battery pack mounted under two seats aligned in the vehicle's widthwise direction, a receiving member is provided between seat rails on an upper surface of a battery case of the battery pack. In this vehicle, when a leg supporting a seat rail tilts, the seat rail abuts against the receiving member, and falling of the seat rail of each seat is suppressed.

SUMMARY

As a method for mounting a battery pack in a vehicle, there is known a method for lifting and thus holding a bottom surface of a battery case by an arm of a carrier device, and, in that condition, carrying and thus mounting the battery pack in the vehicle. In such a method, however, the held battery pack has its center of gravity higher in level than the portion thereof supported by the arm, and the held battery pack is unstable in posture and thus poor in carriability. In addition, in such a method, if there is not enough space around the mounted battery pack, it is difficult to remove the arm from the battery pack and return it to the carrier device after the battery pack has been mounted. For example, when a battery pack is mounted in a recess of a floor panel, not only a space for mounting the battery pack but a space for pulling out the arm from the battery pack must also be provided in the recess, and accordingly, a large space is required in order to mount the battery pack.

In view of the above, the inventor of the present disclosure proposes forming an opening in an upper portion of a battery case, and inserting a holding hook (for example, a part of an arm) of a carrier device into the opening and hanging and thus holding the battery pack by the holding hook, and, in that condition, carrying and mounting the battery pack in a vehicle. The upper portion of the battery case means a portion thereof above a center of the battery case in its heightwise direction.

An opening provided in the upper portion of the battery case can thus be used to hang and thus hold the battery pack. Hanging and thus holding the battery pack allows the held battery pack's center of gravity to be below the portion of the battery pack supported by the holding hook and thus helps to stabilize the held battery pack in posture. Furthermore, when mounting the battery pack in the recess of the floor panel, arranging the opening provided in the upper portion of the battery case to assume a position above the recess eliminates the necessity of providing a space in the recess for pulling out the arm.

However, such an opening may reduce the battery case in strength against a force exerted from above the battery pack. Furthermore, reinforcing the battery case per se leads to an increased cost.

The present disclosure has been made to solve the above problem, and an object thereof is to protect a battery pack against a force exerted from above without reinforcing a battery case.

A vehicle of the present disclosure comprises a battery pack and a frame member. The battery pack includes a battery case and a battery unit accommodated in the battery case. The frame member is disposed over the battery pack and fixed to a vehicular body. The battery case has an upper portion with an opening located under the frame member and formed through at least one of an upper surface of the battery case and a side surface of the battery case.

A battery pack of the present disclosure comprises a battery case and a battery unit, the battery case having an opening to allow a holding hook of a carrier device to be inserted therein to hang and hold the battery pack. The battery pack is carried and mounted in a vehicle by the carrier device. The battery unit is accommodated in the battery case. The opening is formed in an upper portion of the battery case and located under a frame member fixed to a vehicular body of the vehicle.

In the vehicle and battery pack of the present disclosure, an opening formed in an upper portion of a battery case is located under a frame member fixed to a vehicular body of the vehicle. As the frame member is present over the opening, a load exerted from above the battery case can be received by the frame member. Since the frame member is supported by the vehicular body, the load exerted to the frame member is transmitted to the vehicular body and is not easily transmitted to the opening. By this configuration, the load exerted from above the battery case can be received by the vehicular body. For example, if a passenger of the vehicle steps on the frame member and a load is exerted to the frame member, the load can be received by the vehicular body. Thus, according to the vehicle and battery pack of the present disclosure, a load exerted from above the battery case is less likely to be exerted to the opening provided in the upper portion of the battery case. As the load exerted from above the battery case is less likely to be exerted to the opening, the battery pack can be protected against the force exerted from above without reinforcing the battery case (in particular, a portion around the opening).

Note that opening through both an upper surface of the battery case and a side surface of the battery case means opening across the upper surface of the battery case and the side surface of the battery case.

The frame member may be a seat mounting member fixed to a floor panel constituting a portion of the vehicular body. The seat mounting member is one of a seat rail and a seat pipe. The battery pack may be disposed between the floor panel and the seat mounting member and fixed to the floor panel.

Generally, there is a limited possibility that a passenger of the vehicle steps on the seat mounting member, and arranging the opening to be under the seat mounting member can reduce a frequency of a force being exerted toward the opening from above the battery pack. Further, the seat mounting member has large strength, and if a passenger of the vehicle should step on the seat mounting member, the seat mounting member can receive the load.

Note that the seat rail is a rail member constituting a part of a mechanism (a slide mechanism) which slides and thus moves a seat attached to the vehicular body. The seat pipe is a member used in place of the seat rail in order to attach to the vehicular body a seat which does not have the slide mechanism.

A recess may be formed on the floor panel and the battery pack may have a portion inside the recess and the battery pack may be fixed to the floor panel.

The floor panel having a recess in an area in which the battery pack is to be mounted (hereinafter also be referred to as a "battery mounting area") helps registering the battery pack with respect to the battery mounting area. Furthermore, arranging the opening provided in the upper portion of the battery case to assume a position above the recess eliminates the necessity of providing a space in the recess for pulling out the holding hook of the carrier device.

The vehicle may comprise as the seat mounting member a first seat mounting member and a second seat mounting member. As the opening, a first opening and a second opening located under the first seat mounting member, and a third opening and a fourth opening located under the second seat mounting member may be formed in an upper portion of the battery case.

The battery case having an upper portion with four openings enhances the battery pack in carriability. Inserting the holding hook of the carrier device into each of the first to fourth openings formed in the upper portion of the battery case to hang and thus hold the battery pack allows the held battery pack to be more stable in posture than inserting the holding hook of the carrier device into a single opening to hang and thus hold the battery pack.

Arranging the first to fourth openings to be all under the seat mounting member prevents a load from above the battery case from being easily exerted to the first to fourth openings. However, when the first to fourth openings are all arranged under a single seat mounting member, the first to fourth openings are positionally limited to a location under the seat mounting member, and it is thus difficult to arrange the first to fourth openings to be distant from one another. In contrast, as in the above configuration, when the first to fourth openings are arranged separately under the first seat mounting member and the second seat mounting member, the first to fourth openings can be arranged such that the first and second openings and the third and fourth openings are separated. This allows the first to fourth openings to be arranged for example at the four corners of the battery case. When the battery pack is held at four separate locations, the held battery pack's posture is easily stabilized.

The battery case may include an upper cover, a side cover and a lower cover divided from one another. The first to fourth openings may be formed in the upper cover.

Forming the first to forth openings in the upper cover allows the upper cover to easily receive a gravity exerted when the holding hook of the carrier device is inserted into each of the first to fourth openings to hang and thus hold the battery pack.

The upper cover may be a plate-shaped member integrally having an upper surface portion extending in a direction parallel to an upper surface of the battery unit, and a suspended portion extending downward from an outer end in a widthwise direction of the upper surface portion. The side cover may be a plate-shaped member integrally having (i) a side surface portion extending in a direction parallel to a side surface of the battery unit and brought into contact with the suspended portion, (ii) an intermediate portion extending from an upper end of the side surface portion in the widthwise direction inward, and (iii) a contact portion brought into contact with the upper surface portion above the intermediate portion. The first opening, the second opening, the third opening, and the fourth opening may be formed through the suspended portion of the upper cover.

The battery case configured as described above facilitates ensuring a space therein for receiving the holding hook. Since the side cover has an intermediate portion below the upper surface portion of the upper cover, a space can be provided above the intermediate portion of the side cover for receiving the holding hook. Since the upper surface portion of the upper cover and the contact portion of the side cover come into contact with each other, the suspended portion of the upper cover and the side surface portion of the side cover come into contact with each other, and the first to fourth openings are formed in the suspended portion of the upper cover, a space which receives the holding hook through the first to fourth openings is formed between the upper surface portion of the upper cover and the intermediate portion of the side cover.

When the battery case includes a first space to receive the holding hook through the opening and a second space accommodating the battery unit therein it is preferable that the first space and the second space be not in communication with each other. When the holding hook is inserted into the first space, a foreign matter and water easily enter the first space together with external air. In the above configuration, the first space and the second space are not in communication with each other, and the foreign matter or water having entered the first space does not enter the second space. This prevents the foreign matter and water from affecting and thus impairing the performance of the battery unit accommodated in the second space.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

The present disclosure will now be described in embodiments hereinafter in detail with reference to the drawings. In the figures, identical or corresponding components are identically denoted and will not be described repeatedly.

A configuration of a battery pack according to an embodiment of the present disclosure will schematically be described with reference to FIGS. 1 and 2. Each figure indicates mutually orthogonal X, Y and Z axes, and the X axis represents the battery pack's widthwise direction, the Y axis represents the battery pack's lengthwise direction, and the Z axis represents the battery pack's heightwise direction. In the following, one direction indicated by an arrow of each of the X, Y and Z axes is represented with "+" added thereto, and the opposite direction is represented with "−" added thereto. Further, the +Z direction may be referred to as "upper" or the like and the −Z direction may referred to as "lower" or the like.

Figure 1:
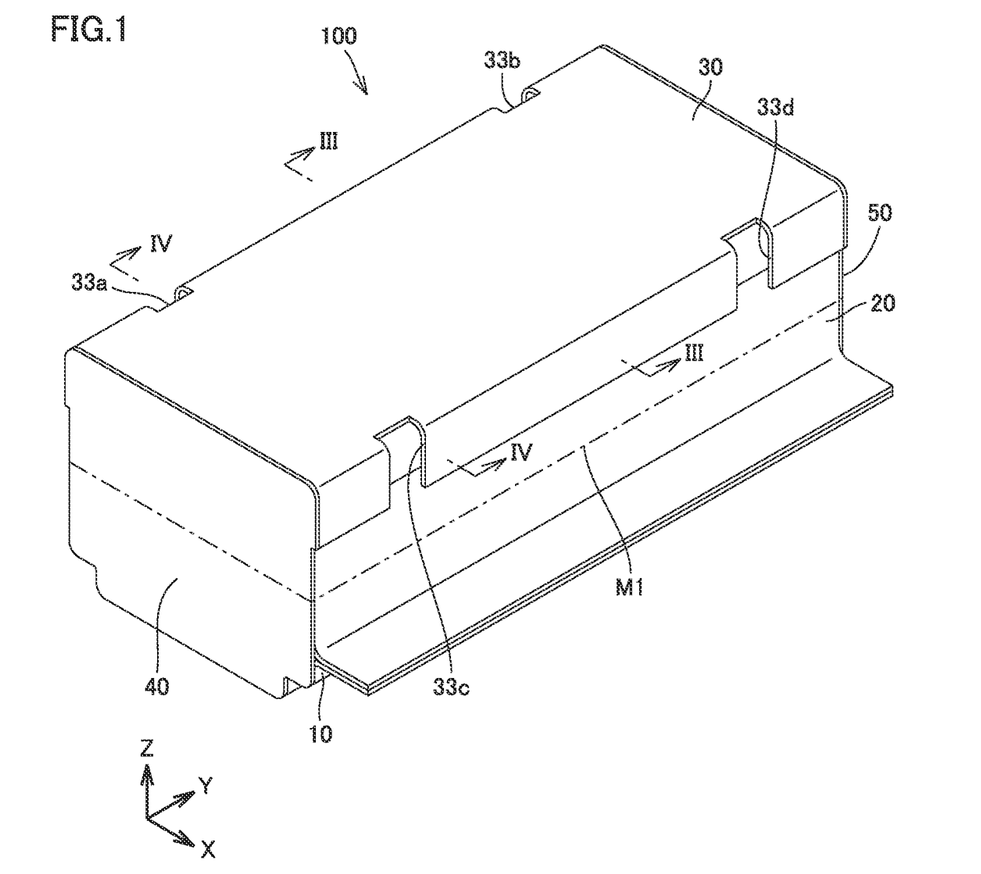
FIG. 1 is a perspective view schematically showing an overall configuration of a battery pack according to an embodiment of the present disclosure.

FIG. 1 is a perspective view schematically showing an overall configuration of a battery pack according to an embodiment of the present disclosure. Referring to FIG. 1, a battery pack 100 includes a battery unit (a battery unit 101 shown in FIG. 2 described later) and a battery case for accommodating the battery unit. The battery case includes a lower cover 10, a side cover 20, an upper cover 30, a front cover 40, and a back cover 50. In the present embodiment, the battery unit has an external shape of a rectangular parallelepiped, and the battery case also has an external shape of a rectangular parallelepiped corresponding to the shape of the battery unit. Lower cover 10, side cover 20, upper cover 30, front cover 40, and back cover 50 configure the battery case's lower surface (a surface in the −Z direction), side surface (a surface in the −X direction and a surface in the +X direction), upper surface (a surface in the +Z direction), front surface (a surface in the −Y direction), and rear surface (a surface in the +Y direction) respectively. As will be described in detail later, side cover 20 includes a first side cover 21 disposed in the −X direction of the battery unit and a second side cover 22 disposed in the +X direction of the battery unit (see FIG. 2). The shape of each of the battery unit and the battery case is not limited to a rectangular parallelepiped, and may be any shape such as a cube for example.

Each cover (lower cover 10, side cover 20, upper cover 30, front cover 40, back cover 50) constituting the battery case is made of, for example, a metal plate. Each cover can be formed by sheet metal working. The battery unit is isolated from external air by being accommodated inside the battery case. At least one of front cover 40 and back cover 50 is provided with a duct capable of communicating with an interior of the battery case. The duct allows refrigerant to be supplied and discharged between the interior of the battery case and an exterior of the battery case. In addition, a valve may be provided at a portion connecting the battery case and the duct. Such a valve can be operated to switch communication/disconnection between the interior of the battery case and the duct.

A line M1 shown in FIG. 1 indicates a center of the battery case in the heightwise direction. Four openings 33a to 33d (first to fourth openings) are formed in an upper portion of the battery case (that is, above line M1 of the battery case).

Figure 2:
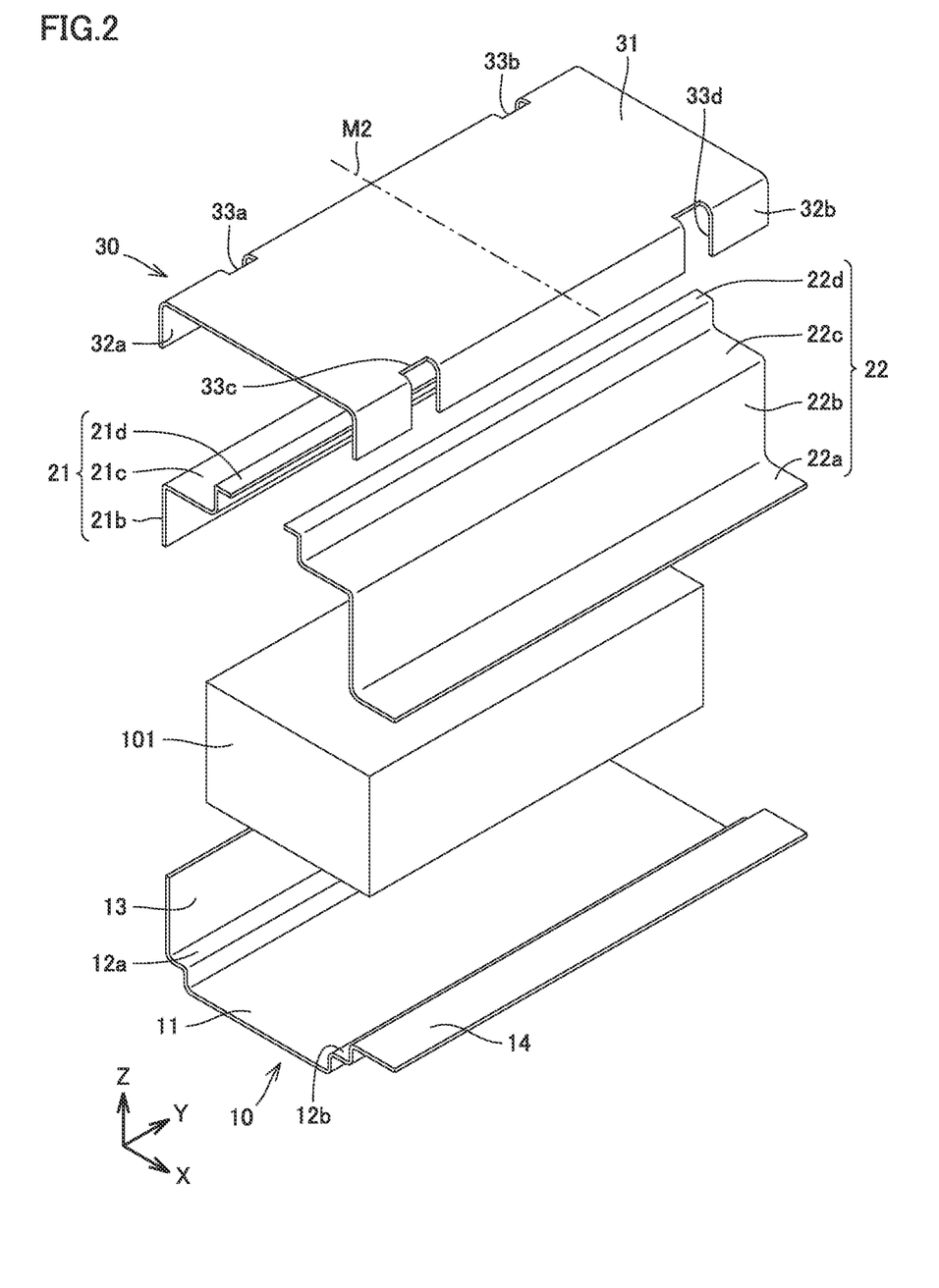
FIG. 2 is an exploded perspective view of the battery pack shown in FIG. 1.

FIG. 2 is an exploded perspective view of battery pack 100. For the sake of convenience of explanation, however, in FIG. 2, battery pack 100's front cover 40 and back cover 50 are not shown, and battery pack 100 is shown with opposite ends in the lengthwise direction opened. Hereinafter, any portion of each cover constituting the battery case that extends in a direction perpendicular to the XY plane will be referred to as a "wall portion."

Referring to FIG. 2, the battery case includes lower cover 10, side cover 20, and upper cover 30 divided from one another.

Lower cover 10 is composed of a single plastically deformed metal plate (for example, an aluminum plate or an aluminum alloy plate). Lower cover 10 includes, as a portion parallel to the XY plane, a bottom surface portion 11, first steps 12a and 12b located above bottom surface portion 11, and a second step 14 located above first steps 12a and 12b. Further, lower cover 10 further includes a wall portion connecting bottom surface portion 11 and first steps 12a, 12b, a wall portion connecting first step 12b and second step 14, and a wall portion 13 extending upward from an edge in the −X direction of first step 12a. Wall portion 13 is located at an end in the −X direction of lower cover 10, and second step 14 is located at an end in the +X direction of lower cover 10.

Side cover 20 includes a first side cover 21 and a second side cover 22. Side cover 20 is such that first side cover 21 and second side cover 22 have second step 21c and second step 22c, respectively, located substantially at the same level, and third step 21d and third step 22d, respectively, located substantially at the same level.

First side cover 21 includes second step 21c and third step 21d located above second step 21c as a portion parallel to the XY plane. First side cover 21 further includes a wall portion connecting second step 21c and third step 21d and a wall portion 21b extending downward from an edge in the −X direction of second step 21c. Wall portion 21b is located at an end in the −X direction of first side cover 21, and third step 21d is located at an end in the +X direction of first side cover 21.

Second side cover 22 includes, as a portion parallel to the XY plane, a first step 22a, second step 22c located above first step 22a, and third step 22d located above second step 22c. Further, second side cover 22 further includes a wall portion (a wall portion 22b and the like) connecting each step. For example, first step 22a and second step 22c are connected via wall portion 22b. Third step 22d is located at an end in the −X direction of second side cover 22, and first step 22a is located at an end in the +X direction of second side cover 22.

Lower cover 10 and first and second side covers 21 and 22 partially contact each other and are mechanically connected or metallurgically bonded at the contact portion. For example, wall portion 13 of lower cover 10 and wall portion 21b of first side cover 21 are overlapped one on the other and the overlapped portions are screwed together to allow lower cover 10 and first side cover 21 to be mechanically connected together. In addition, second step 14 of lower cover 10 and first step 22a of second side cover 22 are overlapped one on the other and the overlapped portions are screwed together to allow lower cover 10 and second side cover 22 to be mechanically connected together.

Upper cover 30 includes an upper surface portion 31 as a portion parallel to the XY plane. Upper cover 30 further includes wall portions 32a and 32b extending downward from opposite ends in the widthwise direction of upper surface portion 31. Wall portion 32a is located at an end in the −X direction of upper cover 30, and wall portion 32b is located at an end in the +X direction of upper cover 30.

Four openings 33a to 33d are formed in upper cover 30. Opening 33a and opening 33c are opposite to each other in the widthwise direction, and so are opening 33b and opening 33d. A line M2 shown in FIG. 2 indicates a center of the battery case in the lengthwise direction. Openings 33a and 33c are located in the −Y direction with reference to line M2, and openings 33b and 33d are located in the +Y direction with reference to line M2. Openings 33a to 33d are cutout portions formed by cutting out from upper surface portion 31 (for example, an end in the widthwise direction of upper surface portion 31) to a lower end of wall portion 32a, 32b.

Battery unit 101 accommodated in the battery case includes a battery such as a lithium ion battery or a nickel metal hydride battery. Battery unit 101 may include an assembled battery composed of a plurality of cells (or secondary cells) connected in series and/or in parallel. When battery unit 101 includes an assembled battery, the assembled battery's accessory parts are also included in battery unit 101. Examples of the assembled battery's accessory parts include a connecting member (a bus bar, a harness, etc.) for electrically connecting the plurality of cells together, a coupling member (a restraint plate, a restraint band or the like) for mechanically coupling the plurality of cells together, a holder (a resin frame or the like) that holds each cell, a sensor that senses each cell's state (the cell's current, voltage, temperature, etc.), and a relay that relays between each cell and an external device.

Battery pack 100 according to the present embodiment is assembled, for example, in the following procedure: Initially, battery unit 101 is placed on lower cover 10. Battery unit 101 may be assembled inside lower cover 10. Subsequently, side cover 20 and upper cover 30 are attached to cover battery unit 101 on lower cover 10, and thereafter, front cover 40 and back cover 50 are attached to opposite ends in the lengthwise direction of lower cover 10, side cover 20 and upper cover 30. A battery case accommodating battery unit 101 is thus obtained. Then, by attaching necessary accessory parts (a duct etc.) to the battery case, battery pack 100 is completed.

Battery pack 100 is mounted in a vehicle and thus used. Battery pack 100 is carried by a carrier device to the battery mounting area of the vehicle. In the present embodiment, openings 33a to 33d are formed in the upper portion of the battery case of battery pack 100. Accordingly, by inserting a holding hook (for example, a part of an arm) of the carrier device into each of openings 33a to 33d, battery pack 100 can be hung and thus held by the holding hook, and in that condition, carried to and thus mounted in a vehicle.

Figure 3:
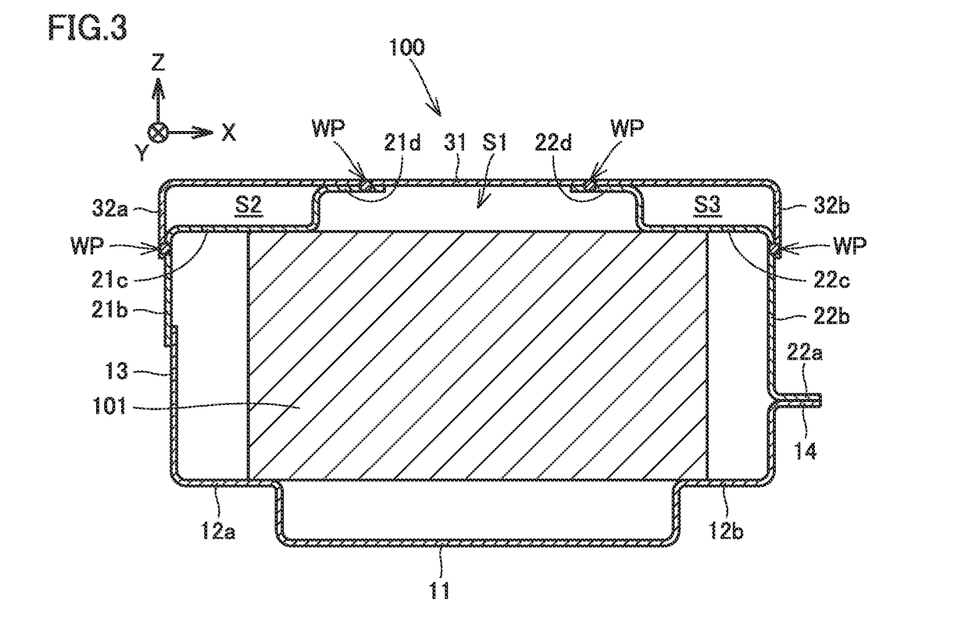
FIG. 3 is a cross section taken along a line shown in FIG. 1.
Figure 4:
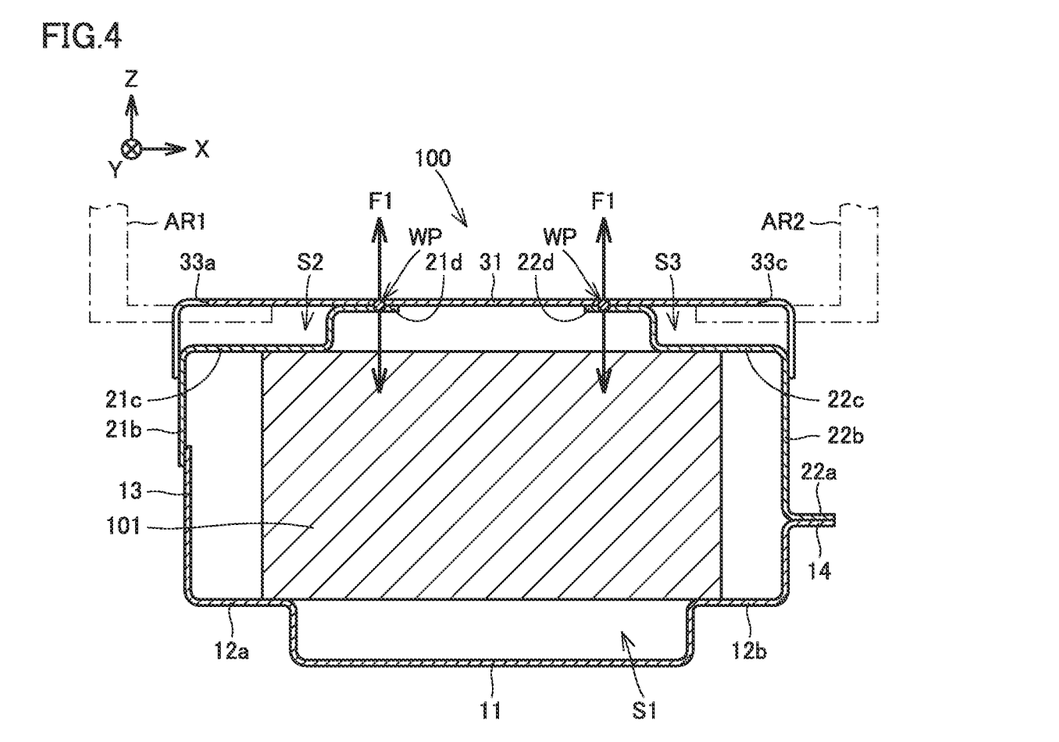
FIG. 4 is a cross section taken along a line IV-IV shown in FIG. 1.

Hereinafter, a structure of holding battery pack 100 will be described with reference to FIGS. 2 to 4. FIG. 3 is a cross section taken along a line shown in FIG. 1. FIG. 4 is a cross section taken along a line Iv-Iv shown in FIG. 1.

With reference to FIGS. 2 to 4, upper cover 30 is a plate-shaped member integrally having upper surface portion 31 extending in a direction parallel to an upper surface of battery unit 101, and wall portions 32a, 32b (a suspended portion) extending downward from outer ends in the widthwise direction of upper surface portion 31. First side cover 21 and second side cover 22 are plate-shaped members integrally having wall portions 21b and 22b (a side surface portion) extending in a direction parallel to side surfaces of battery unit 101, second steps 21c and 22c (an intermediate portion) extending in the widthwise direction inward from upper ends of wall portions 21b and 22b, and third steps 21d and 22d (a contact portion) in contact with upper surface portion 31 above second steps 21c and 22c, respectively. Openings 33a to 33d are formed in wall portions 32a and 32b of upper cover 30. Openings 33a to 33d open across an upper surface of the battery case (i.e., upper surface portion 31) and a side surface of the battery case (i.e., wall portions 32a and 32b).

Upper surface portion 31 of upper cover 30 is in contact with third step 21d of first side cover 21 and third step 22d of second side cover 22. Wall portion 21b of first side cover 21 is in contact with wall portion 32a of upper cover 30 and wall portion 22b of second side cover 22 is in contact with wall portion 32b of upper cover 30. Each contact portion (a portion WP shown in FIGS. 3 and 4) is welded together by way of example.

Between upper surface portion 31 of upper cover 30 and second step 21c of first side cover 21 located below upper surface portion 31, a space S2 (a first space) is formed to receive a holding hook AR1 of the carrier device through openings 33a and 33b (only opening 33a is shown in FIG. 4). Between upper surface portion 31 of upper cover 30 and second step 22c of second side cover 22 located below upper surface portion 31, a space S3 (a first space) is formed to receive a holding hook AR2 of the carrier device through openings 33c and 33d (only opening 33c is shown in FIG. 4). Spaces S2 and S3 are each a space delimited outside side cover 20 by side cover 20 and upper cover 30 and communicate with a space outside the battery case through openings 33a to 33d.

In addition to spaces S2 and S3, the battery case further includes a space S1 (a second space) to accommodate battery unit 101 therein. Space S1 is a space delimited inside side cover 20 by lower cover 10, side cover 20 and upper cover 30, and is not in communication with a space outside the battery case. Further, space S1 communicates with neither space S2 nor S3. Battery unit 101 accommodated in space S1 has a lower surface in contact with first steps 12a and 12b of lower cover 10 and has an upper surface in contact with second step 21c of first side cover 21 and second step 22c of second side cover 22.

When the carrier device carries battery pack 100, two holding hooks of the carrier device are inserted into space S2 through each of openings 33a and 33b. For example, as shown in FIG. 4, holding hook AR1 is inserted into space S2 through opening 33a. Further, two other holding hooks of the carrier device are inserted into space S3 through each of openings 33c and 33d. For example, as shown in FIG. 4, holding hook AR2 is inserted into space S3 through opening 33c.

The carrier device moves the arm to insert the holding hooks (a part of the arm) into spaces S2 and S3, as described above. In battery pack 100, space S1 that accommodates battery unit 101 therein is not in communication with spaces S2 and S3 that receive the holding hooks of the carrier device. As such, in inserting the holding hooks into spaces S2, S3 if together with external air a foreign matter and water enter spaces S2, S3 the foreign matter and water having entered spaces S2, S3 do not enter space S1. This prevents the foreign matter and water from affecting and thus impairing the performance of the battery unit accommodated in space S1.

Subsequently, with the holding hooks inserted in spaces S2 and S3 as described above, the carrier device raises the arm (and hence the holding hooks). As a result, battery pack 100 is lifted with upper surface portion 31 supported by the holding hooks. Battery pack 100 is hung and thus held by the holding hooks. The carrier device thus carries battery pack 100 in the hung and held state to the battery mounting area of the vehicle.

Battery pack 100 has openings 33a to 33d formed in upper cover 30. Forming openings 33a to 33d in upper cover 30 allows upper cover 30 to easily receive a gravity exerted when the holding hooks of the carrier device are inserted into openings 33a to 33d, respectively, to hang and thus hold battery pack 100. In addition, in order to increase upper cover 30 in strength, upper cover 30 may be larger in thickness than side cover 20.

When battery pack 100 is hung and held by the holding hooks of the carrier device, the holding hooks of the carrier device support upper surface portion 31 of upper cover 30 against gravity, and accordingly, a portion at which upper cover 30 and side cover 20 are bonded together experience a force. For example, as shown in FIG. 4, a force F1 acts on a portion where upper surface portion 31 of upper cover 30 is welded to third step 21d of first side cover 21 and a portion where upper surface portion 31 of upper cover 30 is welded to third step 22d of second side cover 22. Force F1 acts in a direction to separate upper surface portion 31 and third steps 21d and 22d from each other. In order to alleviate such a force F1, battery pack 100 also has upper cover 30 and side cover 20 welded together at portions other than the above described portions. Specifically, wall portion 21b of first side cover 21 is welded to wall portion 32a of upper cover 30, and wall portion 22b of second side cover 22 is welded to wall portion 32b of upper cover 30. As a result, force F1 is reduced, and separation between upper surface portion 31 and third steps 21d, 22d is suppressed.

Battery pack 100 carried as described above is mounted in a vehicle. The carrier device causes the arm (and hence the holding hooks) to descend to dispose battery pack 100 in the battery mounting area. Thereafter, the carrier device pulls out the holding hooks through openings 33a to 33d and releases the arm from battery pack 100.

As has been described above, battery pack 100 according to the present embodiment can be hung and thus held by a holding hook, and in that condition, carried to and thus mounted in a vehicle. Inserting holding hooks into openings 33a to 33d formed in the upper portion of the battery case to hang and thus hold battery pack 100 allows the held battery pack 100's center of gravity to be below the portion of the battery pack supported by the holding hooks (i.e., below upper surface portion 31) and thus helps to stabilize the held battery pack 100 in posture. Further, battery pack 100 can be hung and thus held by using openings 33a to 33d, which can contribute to suppressing an increase of a build of battery pack 100 more than when a member projecting outside the battery case (for example, a handle) is provided.

However, openings 33a to 33d as described above may reduce the battery case in strength against a load exerted from above the battery pack. Furthermore, reinforcing the battery case per se leads to an increased cost.

Accordingly, battery pack 100 according to the present embodiment is formed such that the battery case has openings 33a to 33d located under a frame member (a seat rail or the like described later) fixed to the vehicular body of the vehicle. The frame member that is present over openings 33a to 33d can receive a load exerted from above the battery case. Since the frame member is supported by the vehicular body, the load exerted to the frame member is transmitted to the vehicular body and is not easily transmitted to openings 33a to 33d. That is, the load from above the battery case can be received by the vehicular body.

Hereinafter, a vehicle with battery pack 100 mounted therein will be described with reference to FIGS. 5 to 7. Each figure indicates mutually orthogonal FR, LH and G axes, and the FR axis represents the vehicle's front-rear direction, the LH axis represents the vehicle's vehicular widthwise direction, and the G axis represents the vehicle's heightwise direction. In the following, one direction indicated by an arrow of each of the FR, LH and G axes is represented with "+" added thereto, and the opposite direction is represented with "−" added thereto. Further, the +FR direction may be referred to as "front" or the like and the −FR direction may referred to as "rear" or the like. Further, the +G direction may be referred to as "lower" or the like and the −G direction may referred to as "upper" or the like. The "+G direction" corresponds to the vertical direction (the direction of gravity).

Figure 5:
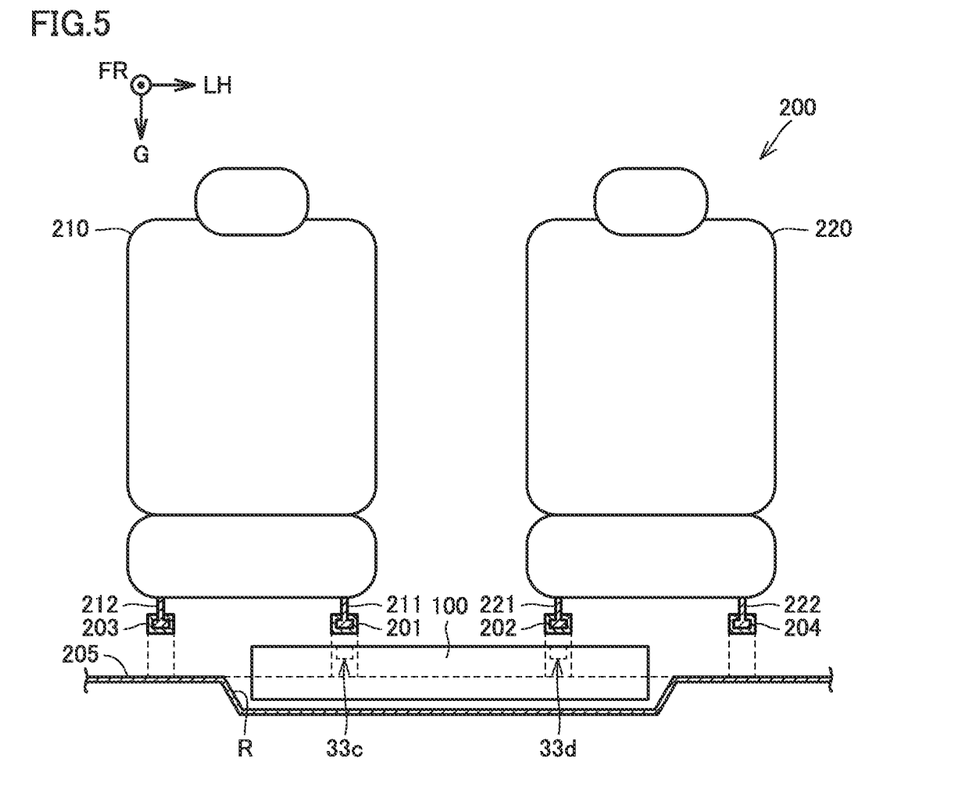
FIG. 5 is a diagram schematically showing a cross-sectional structure around a battery mounting area of a vehicle in which a battery pack is mounted.

FIG. 5 is a diagram schematically showing a cross-sectional structure around a battery mounting area of a vehicle 200 in which battery pack 100 is mounted. FIG. 6 is a top view of vehicle 200 shown in FIG. 5.

Figure 6:
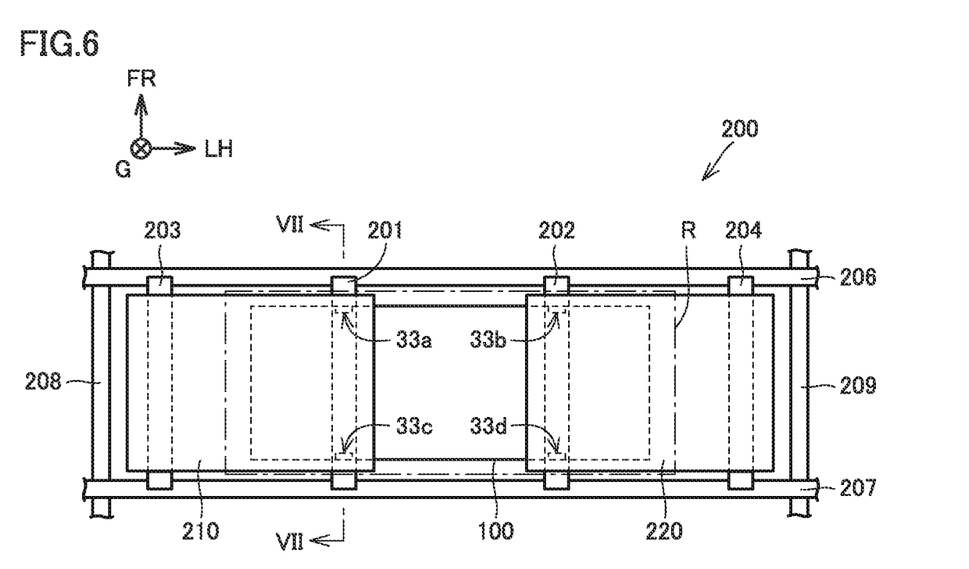
FIG. 6 is a top view of the vehicle shown in FIG. 5.

With reference to FIGS. 5 and 6, vehicle 200 includes battery pack 100. Battery pack 100 is mounted in vehicle 200 such that the widthwise direction of battery pack 100 is in the front-rear direction of vehicle 200, the lengthwise direction of battery pack 100 is in the vehicular widthwise direction of vehicle 200, and the heightwise direction of battery pack 100 is in the heightwise direction of vehicle 200. Vehicle 200 is configured to travel using electric power stored in battery pack 100. Vehicle 200 may be an electric vehicle capable of traveling using only the electric power stored in battery pack 100 or may be a hybrid vehicle capable of traveling by using both the electric power stored in battery pack 100 and the output of an engine (not shown).

Vehicle 200 comprises seats 210 and 220, seat rails 201 to 204 as a seat mounting member, a floor panel 205, cross members 206 and 207 extending in the vehicular widthwise direction of vehicle 200, and side members 208 and 209 extending in the front-rear direction of vehicle 200. Battery pack 100 is disposed to extend in spaces under seats 210 and 220 and between the spaces. Each of seats 210 and 220 may be a front seat, a rear seat, or a seat behind the second row (a third seat etc.).

Floor panel 205 constitutes a part (an underbody) of the vehicular body of vehicle 200. Cross members 206 and 207 and side members 208 and 209 surround seats 210 and 220 and are fixed to floor panel 205. Seat rails 201 to 204 extend in the front-rear direction of vehicle 200 and are fixed to cross members 206 and 207 by a fixing member (brackets 234 and 235 shown in FIG. 7 and described later, or the like).

Seat 210 has a lower surface provided with vertically projecting rail engaging portions 211 and 212. Rail engaging portions 211 and 212 are respectively engaged with seat rails 201 and 203 slidably along seat rails 201 and 203. Furthermore, seat 220 has a lower surface provided with vertically projecting rail engaging portions 221 and 222. Rail engaging portions 221 and 222 are respectively engaged with seat rails 202 and 204 slidably along seat rails 202 and 204. Such a slide mechanism allows seats 210 and 220 attached to the vehicular body to be slid. The user can positionally adjust seats 210 and 220 by sliding seats 210 and 220 in the front-rear direction of vehicle 200.

Of seat rails 201 to 204, seat rails 201 and 202 are disposed over battery pack 100. Battery pack 100 is disposed between floor panel 205 and seat rails 201, 202. Of openings 33a to 33d formed in the upper portion of the battery case of battery pack 100, openings 33a and 33c are located under seat rail 201 (a first seat mounting member) and openings 33b and 33d are located under seat rail 202 (a second seat mounting member).

Floor panel 205 has a recess R. In the present embodiment, an area in recess R of floor panel 205 corresponds to the battery mounting area of vehicle 200. FIG. 7 is a cross section taken along a line VII-VII shown in FIG. 6.

Figure 7:
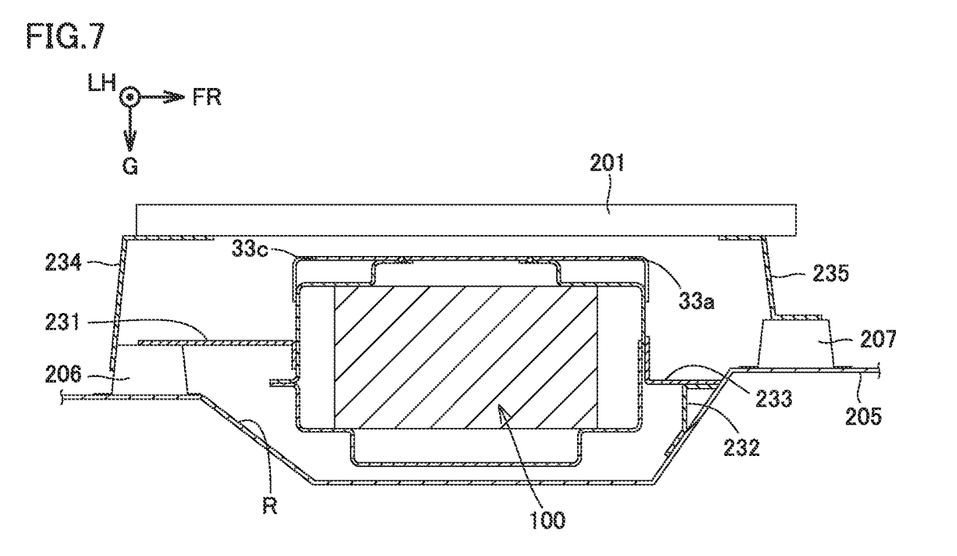
FIG. 7 is a cross section taken along a line VII-VII shown in FIG. 6.

With reference to FIG. 7, battery pack 100 has a portion inside recess R and, in that condition, battery pack 100 is fixed to floor panel 205 by brackets 231 and 233. Bracket 231 is mechanically connected or metallurgically bonded to battery pack 100 and cross member 206. Bracket 232 is a bracket for supporting bracket 233, and is fixed in recess R. Bracket 233 is mechanically connected or metallurgically bonded to battery pack 100 and floor panel 205. Battery pack 100 is fixed to floor panel 205 via brackets 231 and 233 and cross member 206. Battery pack 100 is fixed without touching floor panel 205.

Further, seat rails 201 to 204 (only seat rail 201 is shown in FIG. 7) are fixed to floor panel 205 and disposed at a position above battery pack 100. For example, seat rail 201 is fixed to floor panel 205 by brackets 234 and 235. Bracket 234 is mechanically connected or metallurgically bonded to seat rail 201 and cross member 206. Bracket 235 is mechanically connected or metallurgically bonded to seat rail 201 and cross member 207. Seat rail 201 is fixed to floor panel 205 via brackets 234, 235 and cross members 206, 207.

It is preferable that recess R of floor panel 205 have a size corresponding to the battery mounting area (a size substantially equal to battery pack 100). For example, recess R of floor panel 205 may be slightly larger than battery pack 100. Recess R having such a size helps registering battery pack 100 with respect to the battery mounting area. Furthermore, openings 33a to 33d (only openings 33a and 33c are shown in FIG. 7) provided in the upper portion of the battery case are located at a position above recess R. This eliminates the necessary of providing a space in recess R for pulling out the holding hooks of the carrier device through openings 33a to 33d.

Floor panel 205 having recess R ensures a space for accommodating battery pack 100 between floor panel 205 and seat rails 201, 202. When this is compared with a case in which battery pack 100 is installed on floor panel 205 without a recess, the former allows a distance between cross members 206 and 207 and seat rails 201 and 202 (and hence the length of brackets 234 and 235) to be reduced. With short brackets 234, 235, seat rail 201 less easily falls.

As has been described above, in vehicle 200, openings 33a to 33d formed in the upper portion of the battery case of battery pack 100 are located (vertically) under seat rails 201 and 202 fixed to the vehicular body (floor panel 205). In a plan view, seat rail 201 and openings 33a, 33c overlap, and seat rail 202 and openings 33b, 33d overlap (see FIG. 6). Since seat rails 201 and 202 are present over openings 33a to 33d, a load exerted from above the battery case (a force in the vertical direction) can be received by seat rails 201 and 202. Since seat rails 201, 202 are supported by floor panel 205, the load exerted to seat rails 201, 202 is transmitted to floor panel 205 and is not easily transmitted to openings 33a to 33d. That is, the load exerted from above the battery case can be received by floor panel 205. Thus the load exerted from above the battery case is less likely to be exerted to openings 33a to 33d provided in the upper portion of the battery case. As the load exerted from above the battery case is less likely to be exerted to openings 33a to 33d, battery pack 100 can be protected against the force exerted from above without reinforcing the battery case (in particular, a portion around openings 33a to 33d).

Furthermore, there is a limited possibility that a passenger of vehicle 200 steps on seat rails 201, 202, and arranging openings 33a to 33d to be under seat rails 201 and 202 can reduce a frequency of a force being exerted toward openings 33a to 33d from above battery pack 100. Further, seat rails 201, 202 have large strength, and if a passenger of vehicle 200 should step on seat rails 201, 202, seat rails 201, 202 can receive the load.

Preferably, seat rails 201 and 202 and the upper surface of the battery case are separated to such an extent that seat rails 201 and 202 do not contact the upper surface of the battery case even if seat rails 201 and 202 are stepped on by a passenger of vehicle 200 and bent. However, if there is an excessively large gap between seat rails 201, 202 and the upper surface of the battery case, the gap allows an object to easily enter between seat rails 201, 202 and the upper surface of the battery case. The excessively large gap has a possibility of allowing a fallen object or the like to impart an impact to openings 33a to 33d. It is preferable that seat rails 201, 202 and the upper surface of the battery case be spaced for example by 0 cm to 10 cm. Forming the upper surface of the battery case of a rubber material or the like facilitates providing a spacing of 0 cm between seat rails 201, 202 and the upper surface of the battery.

Figure 8:
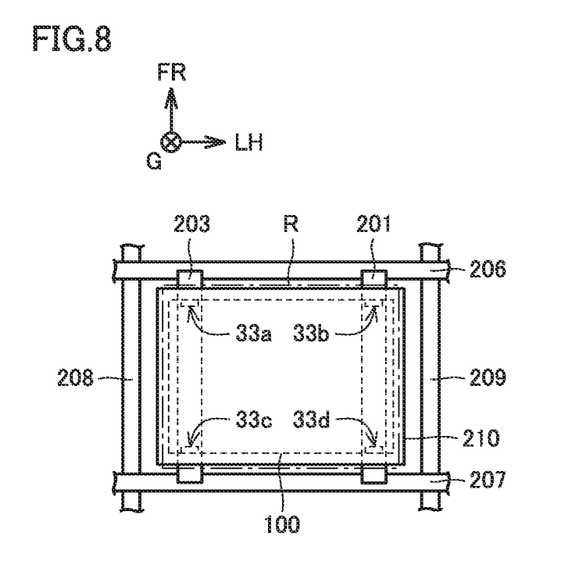
FIG. 8 shows a modified example of the battery mounting area.

The battery mounting area of vehicle 200 is not limited to the position shown in FIG. 6, and may be modified as desired within a range in which battery pack 100 has openings 33a to 33d under a frame member (e.g., a seat rail) fixed to the vehicular body. FIG. 8 shows a modified example of the battery mounting area.

Referring to FIG. 8, battery pack 100 may be disposed under a single seat (e.g., seat 210). In the example shown in FIG. 8, of openings 33a to 33d formed in the upper portion of the battery case of battery pack 100, openings 33a and 33c are located under seat rail 203 (a first seat mounting member) and openings 33b and 33d are located under seat rail 201 (a second seat mounting member).

An opening formed in the upper portion of the battery case and a space receiving a holding hook through the opening can be modified in number, size, shape, etc., as desired within a range allowing the holding hook to be inserted/removed.

Figure 9:
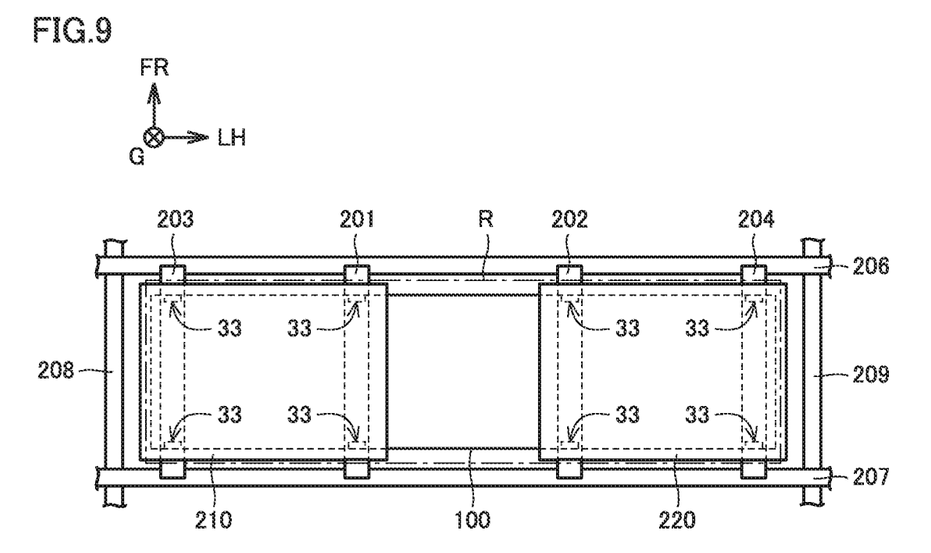
FIG. 9 shows an example in which eight openings are formed in an upper portion of a battery case.

FIG. 9 shows an example in which eight openings are formed in an upper portion of a battery case. With reference to FIG. 9, battery pack 100 is disposed to extend in spaces under seats 210 and 220 and between the spaces. Any of eight openings 33 formed in the upper portion of the battery case of battery pack 100 is located (vertically) under any of seat rails 201 to 204. Two openings 33 are located (vertically) under a single seat rail.

Figure 10:
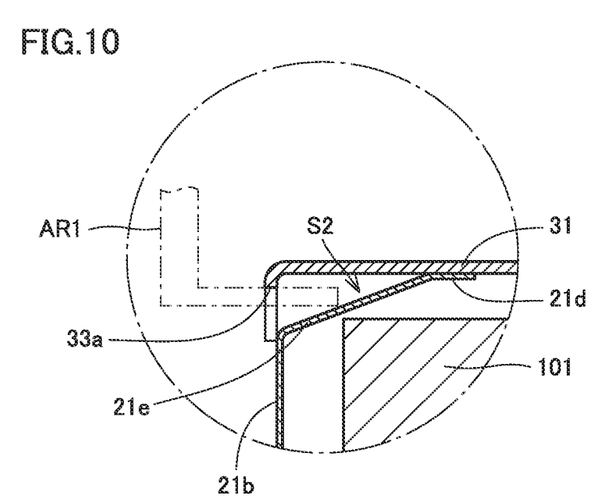
FIG. 10 shows an example in which an opening which opens only through a side surface of a battery case is formed in an upper portion of the battery case.

FIG. 10 shows an example in which an opening which opens only through a side surface of a battery case is formed in an upper portion of the battery case. Referring to FIG. 10, opening 33a opens only at a suspended portion of upper cover 30 (for example, wall portion 32a shown in FIG. 3), and is not opened in upper surface portion 31 of upper cover 30. Further, in the example shown in FIG. 10, instead of second step 21c an inclined portion 21e is provided to connect wall portion 21b and third step 21d via inclined portion 21e (an intermediate portion). Inclined portion 21e is a portion extending in a direction forming an acute angle with respect to the XY plane. Inclined portion 21e extends from an upper end of wall portion 21b inward in the widthwise direction.

Figure 11:
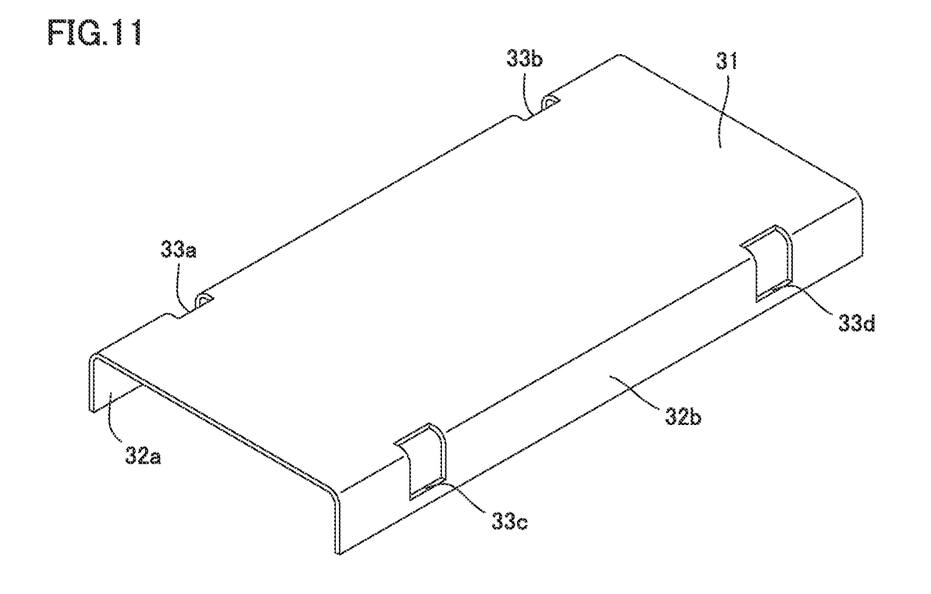
FIG. 11 shows a modified example of a shape of an opening formed in an upper portion of a battery case.

FIG. 11 shows a modified example of a shape of an opening formed in an upper portion of a battery case. With reference to FIG. 11, openings 33a to 33d are throughholes extending in a range from an intermediate portion of each of wall portions 32a and 32b (for example, a vicinity of an extremity of each of wall portions 32a and 32b) to an intermediate portion of upper surface portion 31 (for example, an end in the widthwise direction of upper surface portion 31).

Figure 12:
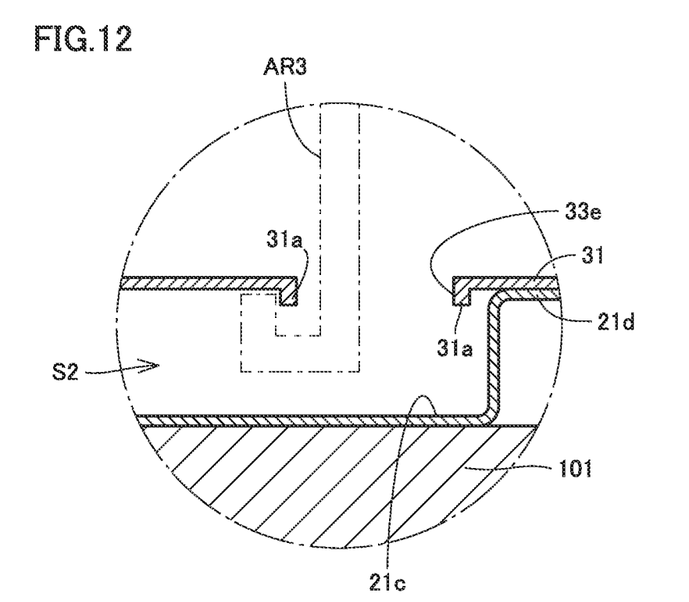
FIG. 12 shows an example in which an opening which opens only through an upper surface of a battery case is formed in an upper portion of the battery case.

FIG. 12 shows an example in which an opening which opens only through an upper surface of a battery case is formed in an upper portion of the battery case. Referring to FIG. 12, an opening 33e opens only through upper surface portion 31 of upper cover 30. Upper surface portion 31 has an engaging portion 31a projecting toward an interior of the battery case. A holding hook AR3 of the carrier device is inserted into space S2 through opening 33e. By engaging holding hook AR3 of the carrier device with engaging portion 31a and thus lifting holding hook AR3, the battery pack can be hung and thus held.

A seat pipe may be used instead of the seat rail as the seat mounting member disposed over an opening formed in the upper portion of the battery case.

The battery case may not have a side cover divided in two. For example, third step 21d of first side cover 21 and third step 22d of second side cover 22 may be connected to form a single side cover.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A vehicle comprising:
a battery pack including a battery case and a battery unit accommodated in the battery case; and
a frame member disposed over the battery pack and fixed to a vehicular body,
the battery case having an upper portion with an opening located under the frame member and formed through at least one of an upper surface of the battery case and a side surface of the battery case,
the frame member being a seat mounting member fixed to a floor panel constituting a portion of the vehicular body,
the seat mounting member being one of a seat rail and a seat pipe, and
the battery pack being disposed between the floor panel and the seat mounting member and fixed to the floor panel.

2. The vehicle according to claim 1, wherein a recess is formed on the floor panel, and
the battery pack has a portion inside the recess and the battery pack is fixed to the floor panel.

3. The vehicle according to claim 1, wherein
the seat mounting member includes a first seat mounting member and a second seat mounting member, and
as the opening, a first opening and a second opening located under the first seat mounting member, and a third opening and a fourth opening located under the second seat mounting member are formed in an upper portion of the battery case.

4. The vehicle according to claim 3, wherein
the battery case includes an upper cover, a side cover and a lower cover divided from one another, and
the first opening, the second opening, the third opening, and the fourth opening are formed through the upper cover.

5. The vehicle according to claim 4, wherein
the upper cover is a plate-shaped member integrally having an upper surface portion extending in a direction parallel to an upper surface of the battery unit, and a suspended portion extending downward from an outer end in a widthwise direction of the upper surface portion,
the side cover is a plate-shaped member integrally having:
(i) a side surface portion extending in a direction parallel to a side surface of the battery unit and brought into contact with the suspended portion;
(ii) an intermediate portion extending from an upper end of the side surface portion in the widthwise direction inward; and
(iii) a contact portion brought into contact with the upper surface portion above the intermediate portion, and
the first opening, the second opening, the third opening, and the fourth opening are formed through the suspended portion of the upper cover.

6. A battery pack comprising:
a battery case with an opening to allow a holding hook of a carrier device to be inserted therein to hang and hold the battery pack, the battery pack being carried and mounted in a vehicle by the carrier device; and
a battery unit accommodated in the battery case,
the opening being formed in an upper portion of the battery case and located under a frame member fixed to a vehicular body of the vehicle.

7. The battery pack according to claim 6, wherein
the battery case includes a first space to receive the holding hook through the opening and a second space accommodating the battery unit therein, and
the first space and the second space are not in communication with each other.

* * * * *